(12) United States Patent
Mabuchi et al.

(10) Patent No.: US 11,901,784 B2
(45) Date of Patent: Feb. 13, 2024

(54) STATOR COIL, METHOD OF MANUFACTURING THE SAME, AND ROTATING ELECTRIC MACHINE

(71) Applicant: Mitsubishi Electric Corporation, Tokyo (JP)

(72) Inventors: Takahiro Mabuchi, Tokyo (JP); Xiaohong Yin, Tokyo (JP); Tsubasa Mori, Tokyo (JP); Makoto Tsukiji, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 455 days.

(21) Appl. No.: 17/273,739

(22) PCT Filed: Oct. 11, 2018

(86) PCT No.: PCT/JP2018/037950
§ 371 (c)(1),
(2) Date: Mar. 5, 2021

(87) PCT Pub. No.: WO2020/075269
PCT Pub. Date: Apr. 16, 2020

(65) Prior Publication Data
US 2021/0351654 A1    Nov. 11, 2021

(51) Int. Cl.
*H02K 3/30* (2006.01)
*H02K 3/34* (2006.01)
(Continued)

(52) U.S. Cl.
CPC .................. *H02K 3/30* (2013.01); *H02K 3/34* (2013.01); *H02K 3/487* (2013.01); *H02K 15/105* (2013.01); *H02K 15/12* (2013.01)

(58) Field of Classification Search
CPC ............ H02K 3/30; H02K 3/34; H02K 3/487; H02K 15/105; H02K 15/12; H02K 2213/03; H02K 15/04; H02K 3/40
See application file for complete search history.

(56) References Cited

U.S. PATENT DOCUMENTS

2018/0137956 A1 * 5/2018 Yamamoto .............. B32B 19/06

FOREIGN PATENT DOCUMENTS

| JP | 60-128843 A | 7/1985 |
| JP | 63-21448 U | 2/1988 |
| JP | 2-17839 A | 1/1990 |

OTHER PUBLICATIONS

International Search Report and Written Opinion dated Jan. 8, 2019, received for PCT Application PCT/JP2018/037950 Filed on Oct. 11, 2018, 9 pages including English Translation.

* cited by examiner

*Primary Examiner* — Thomas Truong
(74) *Attorney, Agent, or Firm* — XSENSUS LLP

(57) ABSTRACT

Provided is a stator coil, including: a coil conductor; a first insulating layer in which a first mica tape is wound and laminated around an outer periphery of the coil conductor; and a second insulating layer in which a second mica tape is wound and laminated around an outer periphery of the first insulating layer, wherein the first mica tape contains mica in a specific content, wherein 60 mass % or more of the mica contained in the first mica tape passes through a JIS standard sieve having a nominal opening of 250 µm, wherein the first mica tape has a specific lamination thickness, and wherein 40 mass % or less of mica contained in the second mica tape passes through the JIS standard sieve having a nominal opening of 250 µm.

6 Claims, 3 Drawing Sheets

(51) Int. Cl.
*H02K 3/487* (2006.01)
*H02K 15/10* (2006.01)
*H02K 15/12* (2006.01)

STATOR COIL, METHOD OF MANUFACTURING THE SAME, AND ROTATING ELECTRIC MACHINE

CROSS-REFERENCE TO RELATED APPLICATION

The present application is based on PCT filing PCT/JP2018/037950, filed Oct. 11, 2018, the entire contents of which are incorporated herein by reference.

TECHNICAL FIELD

The present invention relates to a stator coil, a method of manufacturing the same, and a rotating electric machine using the stator coil.

BACKGROUND ART

A large-size rotating electric machine to be used for a turbine generator or the like includes stator coils accommodated in a plurality of slots formed on an inner peripheral side of a stator core. The stator coil is formed of a coil conductor and an insulating portion wound around an outer periphery of the coil conductor. As a method of forming the insulating portion, there are generally used a method involving winding a mica tape obtained by adhering a fiber reinforcing material, such as glass cloth, to a mica sheet around an outer periphery of a coil conductor a plurality of times, and then impregnating a liquid thermosetting resin composition having low viscosity into the resultant under reduced pressure, followed by a heating press (hereinafter sometimes referred to as "vacuum pressure impregnation method"), a method involving arranging a resin in a semi-cured state on an insulating tape, and winding the tape around an outer periphery of a coil conductor a plurality of times, followed by a heating press (hereinafter sometimes referred to as "resin-rich method"), and the like.

In such rotating electric machine, the stator coil generates heat due to an electric current flowing through the coil conductor during operation. Therefore, there is a risk in that the withstand voltage property of the insulating portion may be decreased with time due to the mechanical stress caused by thermal expansion of the coil conductor made of a metal, such as copper, and the thermal deterioration of the resin component.

In recent years, there is an increasing demand for further downsizing and higher output of the rotating electric machine, and the electric field applied to the insulating portion is increased. Therefore, a stator coil including an insulating portion with a high withstand voltage property is desired.

For example, in Patent Document 1, there is described a high voltage rotating electric machine coil in which a first non-fired laminated mica tape formed of mica flakes each having a large size is wound around a surface of a conductor to form a first main insulating layer, and a second non-fired laminated mica tape formed of mica flakes each having a small size is wound around the first main insulating layer to form a second main insulating layer.

CITATION LIST

Patent Document

Patent Document 1: JP 63-021448 U

SUMMARY OF INVENTION

Technical Problem

A part of the stator coil in which an electric field is the highest is an insulating portion formed in the vicinity of a corner portion of the coil conductor, and in general, dielectric breakdown occurs from this corner portion as a starting point. In order to improve the withstand voltage property, it is required to cause the insulating portion to keep a required amount of a resin for adhering the mica tape and the coil conductor to each other while highly filling mica having a high withstand voltage property into the vicinity of the corner portion of the coil conductor.

However, in Patent Document 1, although the retention of the resin can be enhanced through the use of the mica flakes having different sizes, there is a problem in that the high filling of mica into the vicinity of the corner portion of the coil conductor is insufficient, and the desired withstand voltage property of the stator coil is not obtained.

Solution to Problem

Thus, the present invention has been made to solve the above-mentioned problem, and an object of the present invention is to provide a stator coil capable of enhancing the withstand voltage property and a method of manufacturing the same.

According to one embodiment of the present invention, there is provided a stator coil, including: a coil conductor; a first insulating layer in which a first mica tape is wound and laminated around an outer periphery of the coil conductor; and a second insulating layer in which a second mica tape is wound and laminated around an outer periphery of the first insulating layer, wherein the first mica tape contains mica particles in a content of 30 g or more and 100 g or less per 1 $m^2$ of the mica tape, wherein 60 mass % or more of the mica particles contained in the first mica tape pass through a JIS standard sieve having a nominal opening of 250 μm, wherein the first mica tape has a lamination thickness of 0.1 mm or more and 1 mm or less, and wherein 40 mass % or less of mica particles contained in the second mica tape pass through the JIS standard sieve having a nominal opening of 250 μm.

According to one embodiment of the present invention, there is also provided a method of manufacturing a stator coil, including the steps of: winding and laminating a first mica tape around an outer periphery of a coil conductor so that the laminated first mica tape has a thickness of 0.1 mm or more and 1 mm or less; winding and laminating a second mica tape around an outer periphery of the laminated first mica tape; impregnating a liquid thermosetting resin composition into the coil conductor having the first mica tape and the second mica tape wound therearound; and curing the liquid thermosetting resin composition by heating, wherein the first mica tape contains mica particles in a content of 30 g or more and 100 g or less per 1 $m^2$ of the mica tape, wherein 60 mass % or more of the mica particles contained in the first mica tape pass through a JIS standard sieve having a nominal opening of 250 μm, and wherein 40 mass % or less of mica particles contained in the second mica tape pass through the JIS standard sieve having a nominal opening of 250 μm.

Advantageous Effects of Invention

According to the present invention, the stator coil having a high withstand voltage property and the method of manufacturing the same can be provided.

DESCRIPTION OF EMBODIMENTS

Embodiment 1

Figure 1:
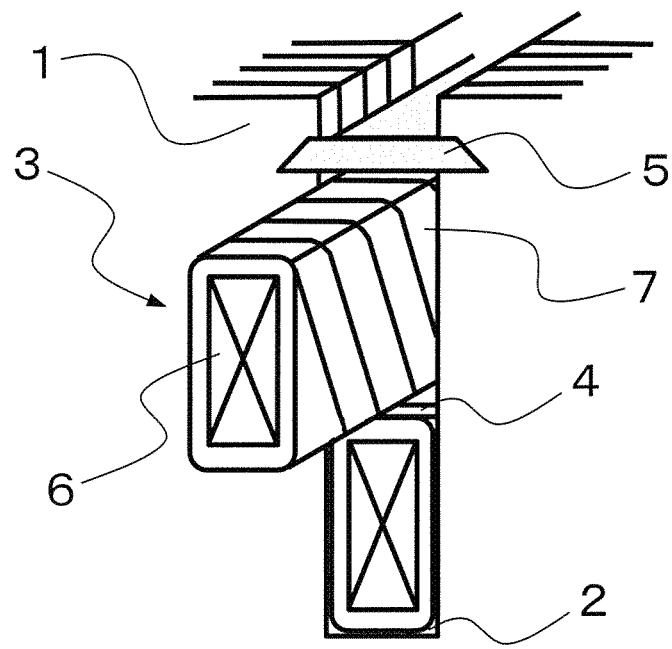
FIG. 1 is a perspective sectional view of a stator for a rotating electric machine according to one embodiment of the present invention.

FIG. 1 is a perspective sectional view of a stator for a rotating electric machine according to Embodiment 1. In FIG. 1, in the stator for a rotating electric machine, stator coils 3 are accommodated in upper and lower two stages in each of a plurality of slots 2 formed on an inner peripheral side of a stator core 1. A spacer 4 is inserted between the stator coils 3 in those two stages. A wedge 5 configured to fix the stator coils 3 is inserted in an opening end portion of each of the slots 2. The wedge 5 has an effect to suppress electromagnetic vibration generated from the stator coils 3 during operation of a rotating electric machine. In addition, the coil conductor 6 has a rectangular shape in cross-section. An outer periphery of the coil conductor 6 is covered with an insulating portion 7 including a first insulating layer and a second insulating layer. With this, ground insulation with the stator core 1 is ensured. As the coil conductor 6, there may be used a bundle of a plurality of metal element wires each being covered with an insulating material, such as a glass tape, and each having a rectangular shape in cross-section, an electric wire including an insulating coating film, or the like. The metal element wire is not particularly limited, and an element wire made of copper, aluminum, silver, or the like may be used.

Figure 2:
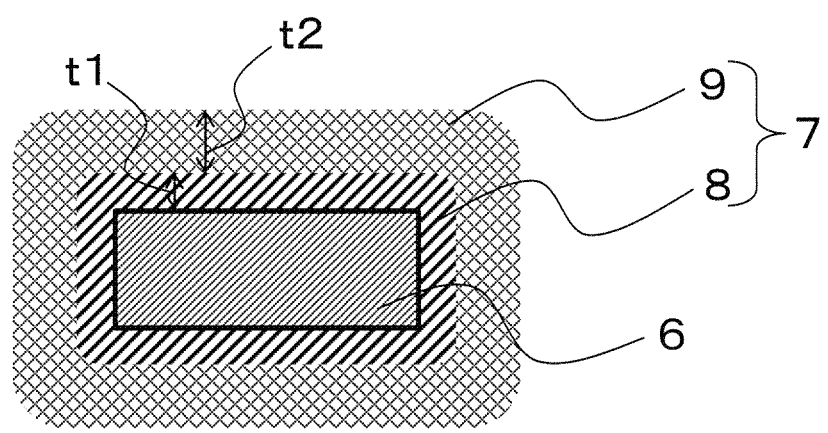
FIG. 2 is a schematic sectional view of a stator coil according to the one embodiment of the present invention.

FIG. 2 is a schematic sectional view of the stator coil according to Embodiment 1. In FIG. 2, the stator coil includes the coil conductor 6 and the insulating portion 7 including a first insulating layer 8 obtained by winding and laminating a first mica tape around an outer periphery of the coil conductor 6 and a second insulating layer 9 obtained by winding and laminating a second mica tape around an outer periphery of the first insulating layer 8.

Figure 3:
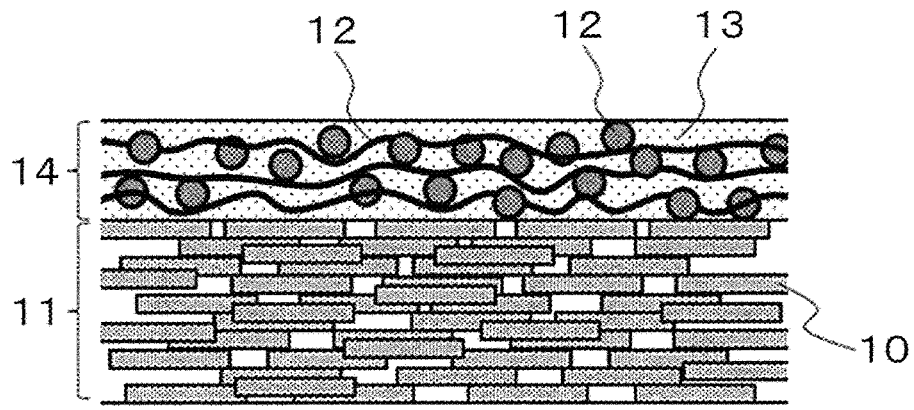
FIG. 3 is a schematic sectional view of a mica tape used in the one embodiment of the present invention.

FIG. 3 is a schematic sectional view of the first mica tape used for forming the insulating portion 7. In FIG. 3, the first mica tape includes a mica layer 11 containing mica particles 10 and a reinforcing layer 14 which is laminated on the mica layer 11 and includes a reinforcing material 12 and a resin 13. The structure of the second mica tape itself is the same as that of the first mica tape, and hence description thereof is omitted.

As the mica particles 10, hard mica, soft mica, or the like which is known as one type of layered silicate mineral may be used. Examples of the shape of the mica particles 10 include laminated mica, block mica, and peeled mica. Those mica particles 10 may be used alone, or two or more kinds thereof may be used in combination.

The reinforcing material 12 is not particularly limited, and examples thereof include glass cloth, alumina cloth, silica cloth, and a resin film. The content of the reinforcing material 12 is preferably 8 g or more and 45 g or less per 1 $m^2$ of the first mica tape (basis weight of 8 $g/m^2$ or more and 45 $g/m^2$ or less). In addition, the content of the reinforcing material 12 in the second mica tape is similar to that of the first mica tape.

The resin 13 is not particularly limited, and examples thereof include an epoxy resin, a silicone resin, and a phenol resin.

The mica layer 11 may contain the above-described resin 13 in addition to the mica particles 10. When the mica layer 11 contains the resin 13, the mica particles 10 adhere to each other, thereby being capable of improving the strength of the mica layer 11.

When the total amount of the mica particles 10 contained in the first mica tape is defined as 100 mass %, the proportion of the mica particles 10 that pass through a JIS standard sieve having a nominal opening of 250 μm is 60 mass % or more, preferably 70 mass % or more. When the proportion of the mica particles 10 that pass through the JIS standard sieve having a nominal opening of 250 μm is set to 60 mass % or more, the mica layer 11 filled with the mica particles 10 each having a small particle diameter is formed in the first mica tape. Therefore, when the first mica tape is wound around the outer periphery of the coil conductor 6, the mica layer 11 of the first mica tape is deformed along corner portions of the coil conductor 6, with the result that wrinkles are less liable to be generated in the first mica tape. As a result, the filling ratio of the mica particles 10 having a high withstand voltage property is increased in each of the corner portions or on the periphery of each of the corner portions of the coil conductor 6, and the withstand voltage property of the stator coil can be improved. In contrast, when the proportion of the mica particles 10 that pass through the JIS standard sieve having a nominal opening of 250 μm is less than 60 mass %, the mica particles 10 each having a particle diameter of 250 μm or more are contained in a certain amount. Therefore, when the first mica tape is wound around the outer periphery of the coil conductor 6, portions of the first mica tape that do not follow the corner portions of the coil conductor 6 are generated, and the filling ratio of a thermosetting resin having a withstand voltage property lower than that of the mica particles 10 is increased in the corner portions. As a result, a desired withstand voltage property of the stator coil cannot be obtained. In the first mica tape, the upper limit of the proportion of the mica particles 10 that pass through the JIS standard sieve having a nominal opening of 250 μm is 100 mass %.

When the total amount of the mica particles 10 contained in the second mica tape is defined as 100 mass %, the proportion of the mica particles 10 that pass through the JIS standard sieve having a nominal opening of 250 μm is 40 mass % or less, preferably 30 mass % or less. When the proportion of the mica particles 10 that pass through the JIS standard sieve having a nominal opening of 250 μm is set to 40 mass % or less, the mica layer 11 of the second mica tape is not easily deformed along the shape of the first insulating layer 8 when the second mica tape is wound around the outer periphery of the first insulating layer 8. Therefore, a minute gap is generated between the second mica tapes. This gap serves as a flow passage for impregnating a liquid thermosetting resin composition, in particular, a flow passage for impregnating the liquid thermosetting resin composition into the laminated first mica tape. As a result, the liquid thermosetting resin composition is sufficiently impregnated into the mica layer 11 of the first mica tape in each of the corner portions or on the periphery of each of the corner portions of the coil conductor 6, and the generation of a void is suppressed. Therefore, the withstand voltage property of the stator coil can be improved. In the second mica tape, the lower limit of the proportion of the mica particles 10 that pass through the JIS standard sieve having a nominal opening of 250 μm is 0 mass %.

As used herein, the nominal opening of the JIS standard sieve is specified in JIS Z8801-1 (2006), and the maximum opening tolerance, the average opening tolerance, the maximum standard deviation, the recommended wire diameter, and the like in each nominal opening satisfy the regulations specified in JIS Z8801-1 (2006). The proportion of the mica particles 10 that pass through the JIS standard sieve having a nominal opening of 250 μm may be calculated by the following procedure. First, the mica tape is heated at 600° C. for 48 hours to thermally decompose and remove a resin component contained in the mica tape. Then, the mica particles 10 contained in the mica tape are taken out, and the mass of the mica particles 10 is measured. Next, the mica particles 10 dispersed in water are supplied onto the JIS standard sieve having a nominal opening of 250 μm, and the mica particles 10 that have passed through the sieve with running water are taken out. After the mica particles 10 are dried, the mass of the mica particles 10 is measured. Based on the mass of the mica particles 10 contained in the mica tape and the mass of the mica particles 10 that have passed through the JIS standard sieve having a nominal opening of 250 μm, the proportion of the mica particles 10 that pass through the JIS standard sieve having a nominal opening of 250 μm is calculated.

The content of the mica particles 10 contained in the first mica tape is 30 g or more and 100 g or less, preferably 40 g or more and 90 g or less, per 1 $m^2$ of the mica tape. When the content of the mica particles 10 contained in the first mica tape is less than 30 g, the mica particles 10 are insufficient. Therefore, the desired withstand voltage property of the stator coil cannot be obtained. Meanwhile, when the content of the mica particle 10 is more than 100 g, the liquid thermosetting resin composition is not sufficiently impregnated into the mica layer 11 of the first mica tape, and a void is generated. Therefore, the desired withstand voltage property of the stator coil cannot be obtained.

The content of the mica particles 10 contained in the second mica tape is preferably 120 g or more and 200 g or less, more preferably 140 g or more and 160 g or less, per 1 $m^2$ of the mica tape. When the content of the mica particles 10 contained in the second mica tape falls within the above-mentioned ranges, the mechanical strength is improved, and the mechanical stress resistance of the stator coil can be improved.

A lamination thickness t1 of the first mica tape is 0.1 mm or more and 1 mm or less, preferably 0.3 mm or more and 0.9 mm or less. The lamination thickness t1 of the first mica tape indicates the thickness of the first insulating layer 8 formed of the first mica tape when the radial cross-section of the stator coil is observed. When the lamination thickness t1 of the first mica tape is less than 0.1 mm, the mica particles 10 arranged along the corner portions of the coil conductor 6 are insufficient. Therefore, the desired withstand voltage property of the stator coil cannot be obtained. Meanwhile, when the lamination thickness t1 of the first mica tape is more than 1 mm, the liquid thermosetting resin composition is not sufficiently impregnated into the mica layer 11 of the first mica tape, and a void is generated. Therefore, the desired withstand voltage property of the stator coil cannot be obtained.

Embodiment 2

Figure 4:
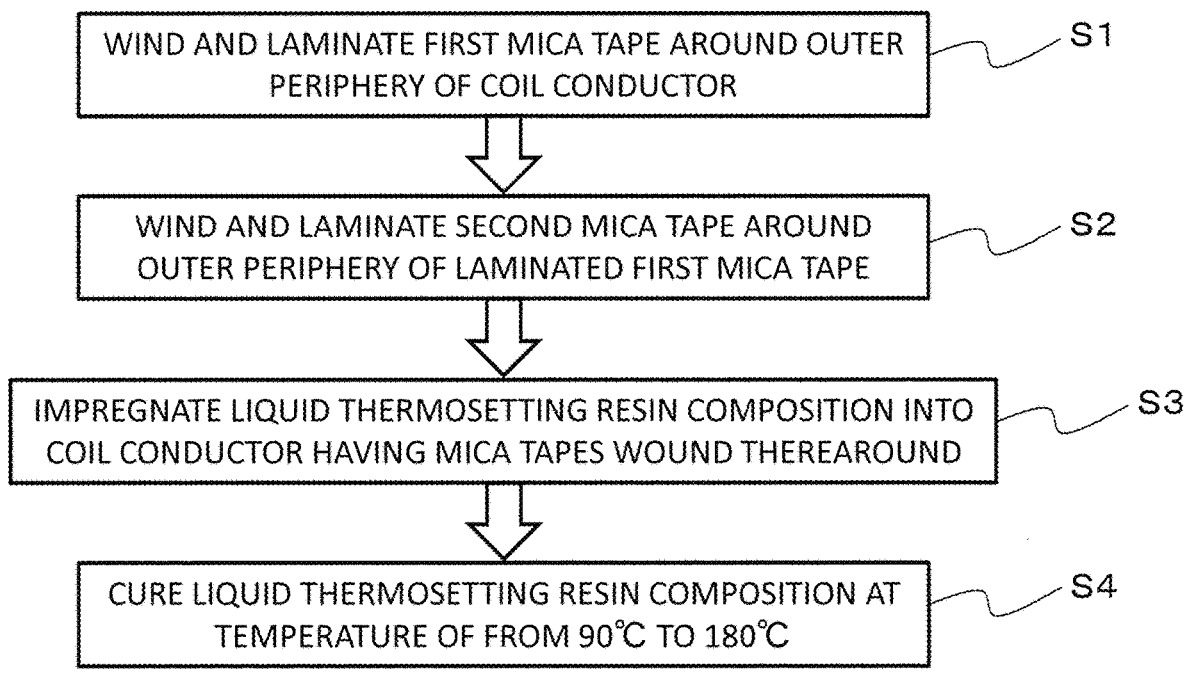
FIG. 4 is a flowchart of a method of manufacturing a stator coil according to one embodiment of the present invention.

In Embodiment 2, a method of manufacturing a stator coil is described. FIG. 4 is a flowchart of the method of manufacturing a stator coil according to Embodiment 2. As a method of forming the insulating portion 7 on the coil conductor 6, there are given a vacuum pressure impregnation method, a resin-rich method, and the like. In the following, a manufacturing method adopting the vacuum pressure impregnation method is described.

The first mica tape is wound and laminated around the outer periphery of the coil conductor 6 so that the lamination thickness t1 is 0.1 mm or more and 1 mm or less (step S1). As the coil conductor 6 and the first mica tape, those described in Embodiment 1 may be used. A prepreg-like mica tape may be used as the first mica tape. In addition, the reason for setting the lamination thickness t1 of the first mica tape within the above-mentioned range is the same as that described in Embodiment 1. When the first mica tape is wound around the outer periphery of the coil conductor 6, the first mica tape may be wound by arranging the mica layer 11 containing the mica particles 10 on the coil conductor 6 side or by arranging the reinforcing layer 14 containing the reinforcing material 12 on the coil conductor 6 side. When the first mica tape is wound by arranging the reinforcing layer 14 containing the reinforcing material 12 on the coil conductor 6 side, the liquid thermosetting resin composition is easily impregnated into the mica layer 11 of the first mica tape. In addition, in order to enhance the impregnation property of the liquid thermosetting resin composition, a resin flow layer made of glass cloth or the like may be separately formed on the mica layer 11 side of the first mica tape. The first mica tape is wound a plurality of times so that parts thereof overlap each other (e.g., a half of the width of the first mica tape overlaps).

Next, the second mica tape is wound and laminated around the outer periphery of the laminated first mica tape (step S2). As the second mica tape, the one described in Embodiment 1 may be used. In addition, the preferred range of the lamination thickness t2 of the second mica tape is the same as that described in Embodiment 1.

Next, under a reduced pressure atmosphere, the liquid thermosetting resin composition is impregnated into the coil conductor 6 having the first mica tape and the second mica tape wound therearound (step S3). After that, the liquid thermosetting resin composition is subjected to pressure impregnation as required. As the liquid thermosetting resin composition, a known composition containing a thermosetting resin, a reactive diluent, and the like may be used. The thermosetting resin is not particularly limited, and examples thereof include an epoxy resin, a phenol resin, a melamine resin, and unsaturated polyester. When an epoxy resin is used as the thermosetting resin, a curing agent and a curing accelerator for an epoxy resin may be used together as required. The reactive diluent is not particularly limited, and a known reactive diluent may be used. The viscosity of the liquid thermosetting resin composition is not particularly limited, but is preferably 500 mPa·s or less at 40° C.

Finally, the liquid thermosetting resin composition is cured by heating at a temperature of 90° C. or more and 180° C. or less in a normal pressure state (step S4). Through such steps, the stator coil according to this embodiment can be obtained.

The stator coil thus manufactured has the structure of the stator coil described in Embodiment 1, and hence the mica particles 10 having a high withstand voltage property are highly filled into each of the corner portions or the periphery of each of the corner portions of the coil conductor 6, and a required amount of the thermosetting resin composition that adheres the first mica tape and the second mica tape to the coil conductor 6 is held in the insulating portion 7. Therefore, the stator coil has a high withstand voltage property.

Embodiment 3

Figure 5:
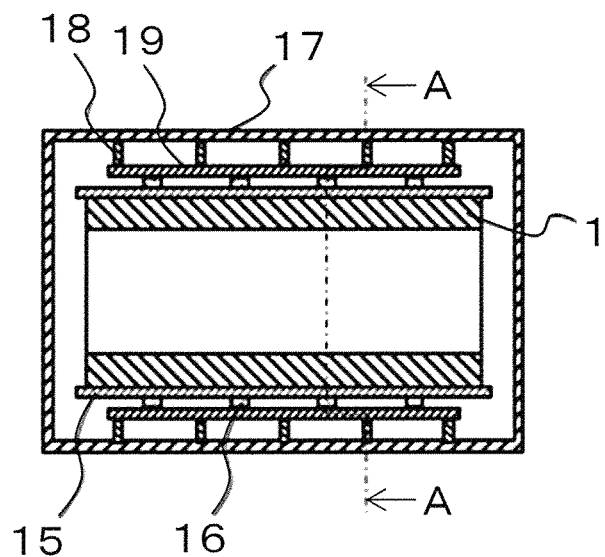
FIG. 5 is a view for schematically illustrating main parts of a stator for a rotating electric machine according to one embodiment of the present invention, and is a view (transverse sectional view) for illustrating a cross-section along a rotating shaft.
Figure 6:
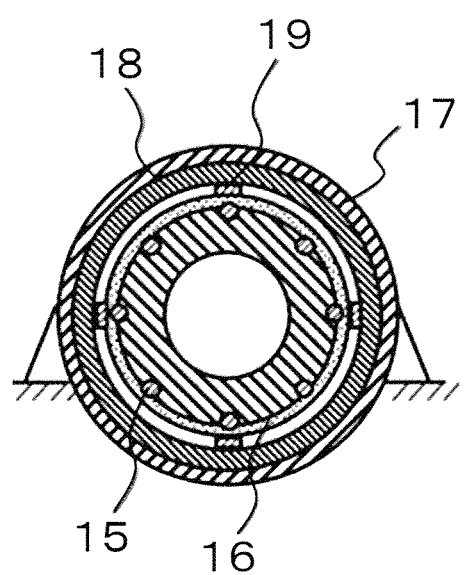
FIG. 6 is a view for schematically illustrating main parts of the stator for a rotating electric machine according to the one embodiment of the present invention, and is a view (vertical sectional view) of a cross-section orthogonal to the rotary shaft when viewed from a direction of the arrow A in FIG. 5.

FIG. 5 is a view for schematically illustrating main parts of a stator for a rotating electric machine according to Embodiment 3, and is a view (transverse sectional view) for illustrating a cross-section along a rotary shaft. FIG. 6 is a view for schematically illustrating main parts of the stator for a rotating electric machine according to Embodiment 3, and is a view (vertical sectional view) of a cross-section orthogonal to the rotary shaft when viewed from a direction of the arrow A in FIG. 5.

In FIG. 5 and FIG. 6, the stator for a rotating electric machine includes the stator core 1, a plurality of (eight in this example) core fastening members 15, a plurality of (four in this example) holding rings 16, a frame 17, a plurality of (five in this example) middle frame members 18, and a plurality of (four in this example) elastic support members 19. The stator core 1 is formed in a cylindrical shape, and a rotator is accommodated on an inner peripheral side thereof. The core fastening members 15 are arranged on an outer peripheral portion of the stator core 1 at predetermined intervals in a circumferential direction, and are configured to fasten the stator core 1 in the axial direction. The holding rings 16 are each formed in a flat shape in the axial direction, and are arranged on the outer peripheral portion of the stator core 1 at predetermined intervals in the axial direction. The holding rings 16 are each configured to fasten and hold the stator core 1 from each outer periphery of the core fastening members 15 in a rotary shaft direction. The frame 17 is formed in a cylindrical shape, and is configured to surround the stator core 1 at an interval around the stator core 1. The middle frame members 18 are each formed in a ring shape, and are each configured to protrude in an axial center direction at predetermined intervals in the axial direction on an inner surface of the frame 17. The elastic support members 19 are each formed of a spring plate which is fixed to the adjacent middle frame members 18 and fixed to the holding rings 16 in a center portion in the axial direction thereof. The stator for a rotating electric machine illustrated in FIG. 5 and FIG. 6 is configured to form, for example, an armature of a turbine generator. A predetermined number of slots formed in the axial direction are arranged in the circumferential direction in an inner peripheral portion of the stator core 1. The stator coil described in Embodiment 1 is accommodated in each of the slots.

A rotating electric machine including the stator configured as described above can achieve higher output and further downsizing by increasing the withstand voltage of the stator coil. In particular, when the above-mentioned configuration of the rotating electric machine is applied to a turbine generator, the thickness of the insulating portion on the outer periphery of the coil conductor can be reduced by increasing the withstand voltage of the stator coil. With this, the heat generation of the coil conductor is reduced, and high output and high efficiency of the turbine generator can be achieved.

EXAMPLES

Example 1

A first mica tape shown in Table 1 was wound and laminated around an outer periphery of a coil conductor (sectional shape: rectangle of 10 mm×50 mm, length: 1 m), and a second mica tape shown in Table 1 was wound and laminated around an outer periphery of the laminated first mica tape. After that, under a reduced pressure atmosphere, a liquid thermosetting resin composition containing bisphenol F-type epoxy and hexahydrophthalic anhydride (curing agent for an epoxy resin) was impregnated into the coil conductor having the mica tapes wound therearound. As a reinforcing material for the first mica tape and the second mica tape, glass cloth of 20 g per 1 m² of the mica tape (basis weight of 20 g/m²) was used. In order to improve the impregnation property, the liquid thermosetting resin composition was heated to 50° C. to be used. The coil conductor having the mica tapes wound therearound was held for 4 hours under a state of being completely immersed in the liquid thermosetting resin composition, and then held for 8 hours in a pressure atmosphere of 0.7 MPa. After that, the coil conductor having the mica tapes wound therearound was taken out and heated at 155° C. for 24 hours to cure the liquid thermosetting resin composition, to thereby obtain a stator coil of Example 1. Electrodes were arranged in a length of 30 cm at the center of the obtained stator coil through use of a silver paste for a withstand voltage test. In addition, in order to alleviate an electric field, a SiC coating was applied from an end portion of the silver paste to an end portion of the stator coil and dried at 100° C. for 3 hours. After that, an AC voltage was applied to the stator coil at a voltage step-up rate of 1 KV/mm, and a voltage at which dielectric breakdown occurred was measured. In addition, the center portion of the stator coil was cut in a radial direction, and a cross-section thereof was observed with a microscope, to thereby confirm the presence or absence of a void. The case in which there was no void was evaluated as satisfactory impregnation property (○), and the case in which there was a void was evaluated as unsatisfactory impregnation property (×). The results are shown in Table 1.

Examples 2 to 10

Stator coils of Examples 2 to 10 were obtained in the same manner as Example 1 except that the first mica tapes and the second mica tapes shown in Table 1 were used. The obtained stator coils were evaluated in the same manner as in Example 1. The dielectric breakdown voltage was evaluated to be satisfactory (○) in the case of 100% or more and 120% or less of the value of the dielectric breakdown voltage of the stator coil of Example 1, and evaluated to be unsatisfactory (×) in the case of 80% or less of the value of the dielectric breakdown voltage of the stator coil of Example 1. The results are shown in Table 1.

Comparative Examples 1 to 12

Stator coils of Comparative Examples 1 to 12 were obtained in the same manner as Example 1 except that the first mica tapes and the second mica tapes shown in Table 2 were used. The obtained stator coils were evaluated in the same manner as in Example 1. The dielectric breakdown voltage was evaluated to be satisfactory (○) in the case of 100% or more and 120% or less of the value of the dielectric breakdown voltage of the stator coil of Example 1, and evaluated to be unsatisfactory (×) in the case of 80% or less of the value of the dielectric breakdown voltage of the stator coil of Example 1. The results are shown in Table 2.

TABLE 1

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| First mica tape | 250 μm sieve passing ratio (mass %) | 60 | 60 | 95 | 95 | 95 | 60 | 60 | 95 | 95 | 95 |
|  | Content of mica (g/m$^2$) | 30 | 100 | 30 | 100 | 100 | 30 | 100 | 30 | 100 | 100 |
|  | Lamination thickness (mm) | 0.5 | 0.5 | 0.5 | 0.5 | 0.9 | 0.5 | 0.5 | 0.5 | 0.5 | 0.9 |
| Second mica tape | 250 μm sieve passing ratio (mass %) | 40 | 40 | 40 | 40 | 40 | 0 | 0 | 0 | 0 | 0 |
|  | Content of mica (g/m$^2$) | 160 | 160 | 160 | 160 | 160 | 160 | 160 | 160 | 160 | 160 |
|  | Lamination thickness (mm) | 2 | 2 | 2 | 2 | 2 | 2 | 2 | 2 | 2 | 2 |
| Evaluation | Impregnation property | ○ | ○ | ○ | ○ | ○ | ○ | ○ | ○ | ○ | ○ |
|  | Dielectric breakdown voltage | ○ | ○ | ○ | ○ | ○ | ○ | ○ | ○ | ○ | ○ |

TABLE 2

|  |  | Comparative Example | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 |
| First mica tape | 250 μm sieve passing ratio (mass %) | 60 | 60 | 95 | 95 | 60 | 60 | 55 | 55 | 95 | 95 | 95 | 95 |
|  | Content of mica (g/m$^2$) | 30 | 100 | 30 | 100 | 105 | 25 | 30 | 100 | 105 | 25 | 100 | 100 |
|  | Lamination thickness (mm) | 0.5 | 0.5 | 0.5 | 0.5 | 0.5 | 0.5 | 0.5 | 0.5 | 0.5 | 0.5 | 1.1 | 0.01 |
| Second mica tape | 250 μm sieve passing ratio (mass %) | 45 | 45 | 45 | 45 | 40 | 40 | 40 | 40 | 40 | 40 | 40 | 40 |
|  | Content of mica (g/m$^2$) | 160 | 160 | 160 | 160 | 160 | 160 | 160 | 160 | 160 | 160 | 160 | 160 |
|  | Lamination thickness (mm) | 2 | 2 | 2 | 2 | 2 | 2 | 2 | 2 | 2 | 2 | 2 | 2 |
| Evaluation | Impregnation property | x | x | x | x | x | ○ | ○ | ○ | x | ○ | x | ○ |
|  | Dielectric breakdown voltage | x | x | x | x | x | x | x | x | x | x | x | x |

When a general-purpose mica tape is used, and there is no problem in impregnation property of the liquid thermosetting resin composition, the dielectric breakdown voltage of a stator coil to be obtained is about 80%, including a variation, of the value of the dielectric breakdown voltage of the stator coil of Example 1. Thus, it can be said that the stator coils of Examples 1 to 10 each have a withstand voltage property that is 1.2 or more times as high as that of the stator coil using the general-purpose mica tape. When the stator coils of Examples 1 to 10 are used for a turbine generator, the thickness of the insulating portion on the outer periphery of the coil conductor can be reduced by increasing the withstand voltage of the stator coil. With this, the heat generation of the coil conductor is reduced, and high output and high efficiency of the turbine generator can be achieved.

As is apparent also from the results of Examples and Comparative Examples, according to the embodiments of the present invention, a stator coil having a high withstand voltage property and a method of manufacturing the same can be provided.

EXPLANATION ON NUMERALS

1 Stator core
2 Slot
3 Stator coil
4 Spacer
5 Wedge
6 Coil conductor
7 Insulating portion
8 First insulating layer
9 Second insulating layer
10 Mica particle
11 Mica layer
12 Reinforcing material
13 Resin
14 Reinforcing layer
15 Core fastening member
16 Holding ring
17 Frame
18 Middle frame member
19 Elastic support member
t1 Lamination thickness of first mica tape
t2 Lamination thickness of second mica tape

The invention claimed is:

1. A stator coil, comprising:
a coil conductor;
a first insulating layer in which a first mica tape is wound and laminated around an outer periphery of the coil conductor; and
a second insulating layer in which a second mica tape is wound and lair inated around an outer periphery of the first insulating layer,
wherein the first mica tape contains mica particles in a content of 30 g or more and 100 or less per 1 m$^2$ of the mica tape,
wherein 60 mass % or more of the mica particles contained in the first mica tape pass through a JIS standard sieve having a nominal opening of 250 μm,
wherein the first mica tape has a lamination thickness of 0.1 mm or more and 1 mm or less, and
wherein 40 mass % or less of mica particles contained in the second mica tape pass through the HS standard sieve having a nominal opening of 250 μm.

2. The stator coil according to claim 1, wherein the coil conductor has a rectangular shape in cross-section.

3. A rotating electric machine, comprising the stator coil of claim 1 accommodated in a slot of a stator core.

4. The stator coil according to claim 1, wherein:
the JIS standard is JIS Z8801-1 (2006).

5. A method of manufacturing a stator coil, comprising the steps of:
winding and laminating a first mica tape around an outer periphery of a coil conductor so that the laminated first mica tape has a thickness of 0.1 mm or more and 1 mm or less;

winding and laminating a second mica tape around an outer periphery of the laminated first mica tape;

impregnating a liquid thermosetting resin composition into the coil conductor having the first mica tape and the second mica tape wound therearound; and curing the liquid thermosetting resin composition by heating, wherein the first mica tape contains mica particles in a content of 30 g or more and 100 g or less per 1 m² of the mica tape, wherein 60 mass % or more of the mica particles contained in the first mica tape pass through a JIS standard sieve having a nominal opening of 250 μm, and wherein 40 mass % or less of mica particles contained in the second mica tape pass through the JIS standard sieve having a nominal opening of 250 μm.

6. The method according to claim 5, wherein:
the JIS standard is JIS Z8801-1 (2006).

\* \* \* \* \*